Dec. 3, 1963     F. H. TENNIS ETAL     3,112,763
COMBINED HIGH PRESSURE RELIEF AND VOID CONTROL VALVE
Filed April 12, 1962     2 Sheets-Sheet 1

Inventors
Francis H. Tennis
Donald G. Bethke

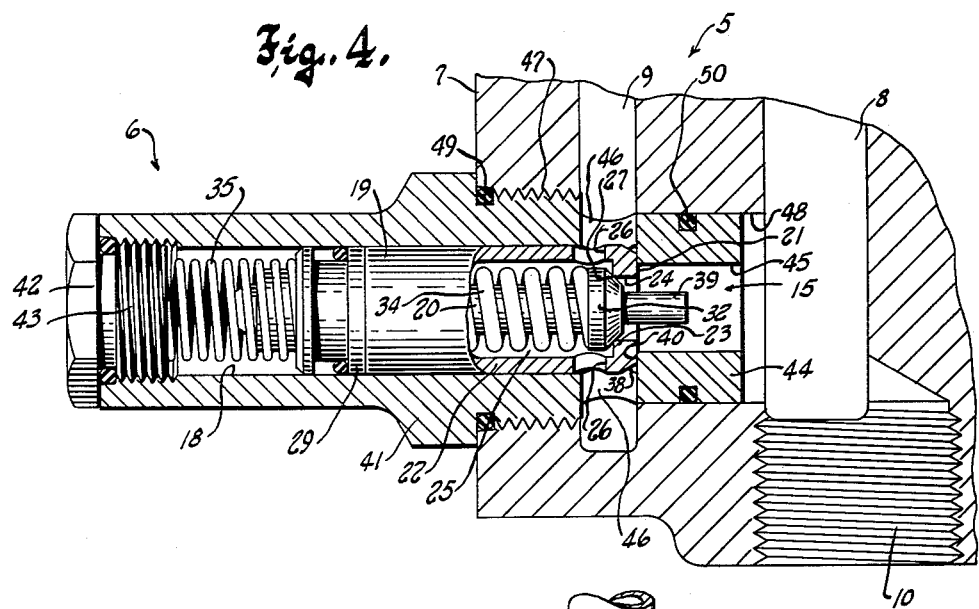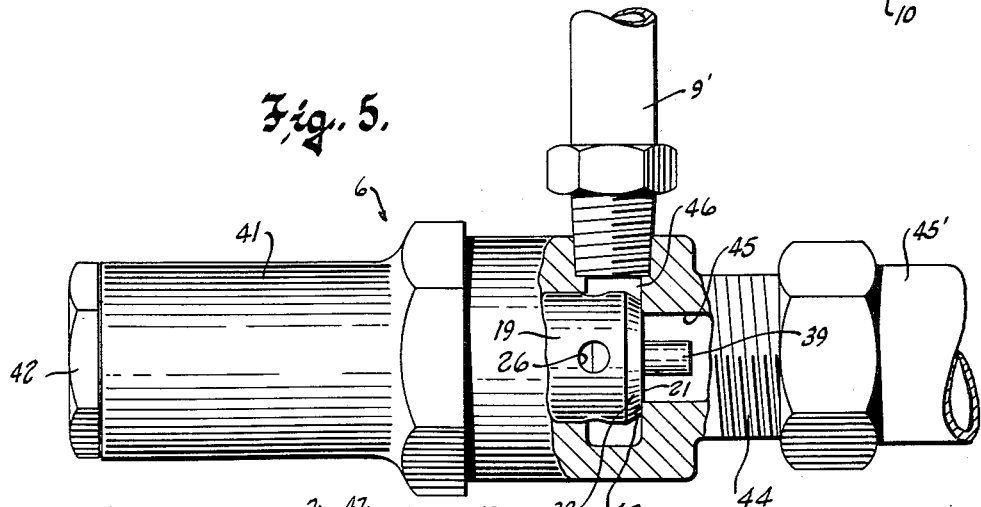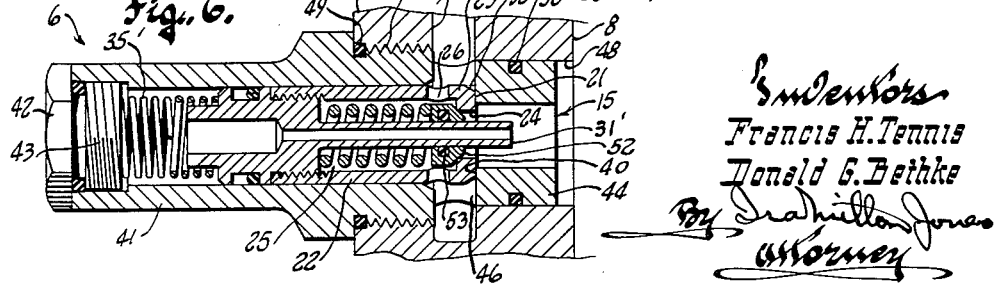

United States Patent Office 3,112,763
Patented Dec. 3, 1963

3,112,763
COMBINED HIGH PRESSURE RELIEF AND
VOID CONTROL VALVE
Francis H. Tennis, Milwaukee, and Donald G. Bethke,
Pewaukee, Wis., assignors to Hydraulic Unit Specialties
Company, Pewaukee, Wis., a corporation of Wisconsin
Filed Apr. 12, 1962, Ser. No. 186,906
1 Claim. (Cl. 137—493.5)

This invention relates to relief valves for fluid pressure operated systems, and refers more particularly to an improved relief valve which will open and relieve abnormally high as well as abnormally low fluid pressure conditions in a system in which the valve is connected.

Such a valve mechanism can be considered a combined high pressure relief and void control valve, and it is adapted for incorporation in a fluid pressure operated system in such a manner that when it opens in response to either an abnormally high system pressure or an abnormally low system pressure, it effects communication of a high pressure supply line of the system with a reservoir or return line in which fluid is present at atmospheric pressure or at a pressure slightly above atmospheric. Consequently, when relieving an abnormally high pressure condition in the system, the valve of this invention allows fluid from a high pressure line of the system to flow to the reservoir; and when relieving an abnormally low pressure condition in the system, such as when the system pressure falls below that of fluid in the return line, it allows fluid from the return line or reservoir to flow into the high pressure supply line of the system to prevent a vacuum from being drawn in a cylinder or the like operated by the system.

Thus, fluid pressures in the system which are below the static pressure of fluid in the reservoir may be regarded as abnormally low pressures, and in a sense the reservoir pressure affords a reference value to which system pressures may be related.

The main purpose of this invention is to provide a combined high pressure relief and void control valve which can be easily installed in any fluid pressure operated system, and which features simplicity of construction and low cost of manufacture without the sacrifice of sturdiness and reliability.

More specifically, it is an object of this invention to provide a combined high pressure relief and void control valve of the character described which features a minimum number of components, and which can be constructed either as a unitary mechanism capable of incorporation in any fluid pressure operated system, or in a simpler version, as an auxiliary mechanism that can be attached to a hydraulic control valve or the like, in which environment it depends upon certain passages and surfaces of the control valve body for its successful operation.

It is a further object of this invention to provide a combined high pressure relief and void control valve of the character described featuring a poppet mechanism that comprises concentric tubular inner and outer poppets, the outer of which is adapted to control a low pressure relief passage and the inner of which is adapted to control a high pressure relief passage that extends through the outer poppet.

With these and other objects in view which will appear as the description proceeds, this invention resides in the novel construction, combination and arrangement of parts substantially as hereinafter described and more particularly defined by the appended claim, it being understood that such changes in the precise embodiment of the hereindisclosed invention may be made as come within the scope of the claim.

The accompanying drawings illustrate several complete examples of the physical embodiments of the invention constructed according to the best modes so far devised for the practical application of the principles thereof, and in which:

FIGURE 4 is a longitudinal sectional view of a modified valve of this invention showing the valve applied to a hydraulic control valve and in its normally closed position;

FIGURE 5 is a view partly in elevation and partly in longitudinal section of still another embodiment of the invention wherein the mechanism is a complete unit in itself and is not in anywise dependent upon a hydraulic control valve or the like for its operation; and FIGURE 6 is a view similar to FIGURE 4, but illustrating a slightly different embodiment of the invention.

Figure 1:
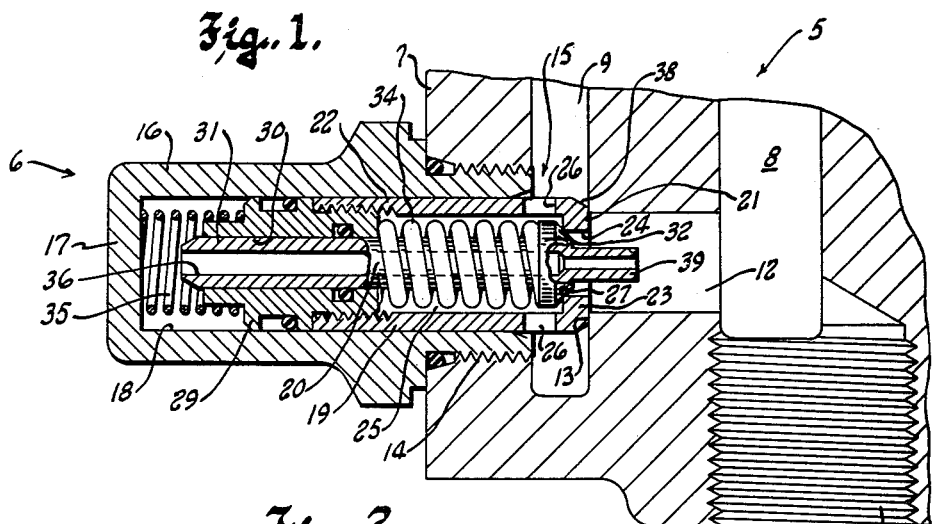
FIGURE 1 is a longitudinal sectional view of the relief valve of this invention illustrating its application to a hydraulic control valve.
Figure 2:
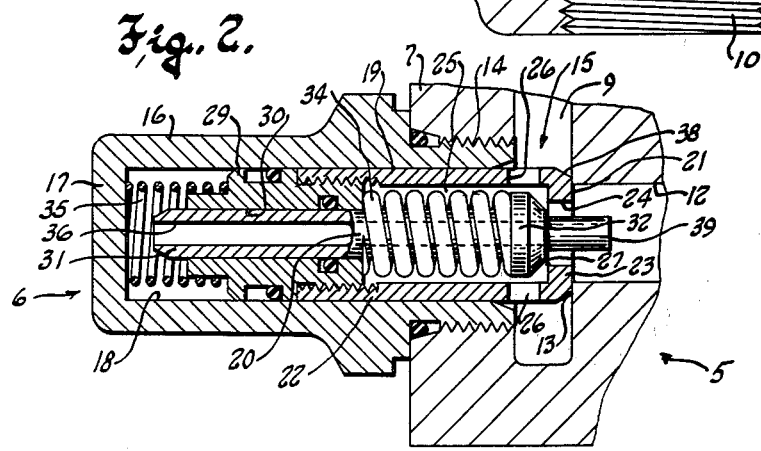
FIGURE 2 is a view similar to FIGURE 1 showing the manner in which the inner poppet is unseated in consequence of an abnormally high pressure condition.
Figure 3:
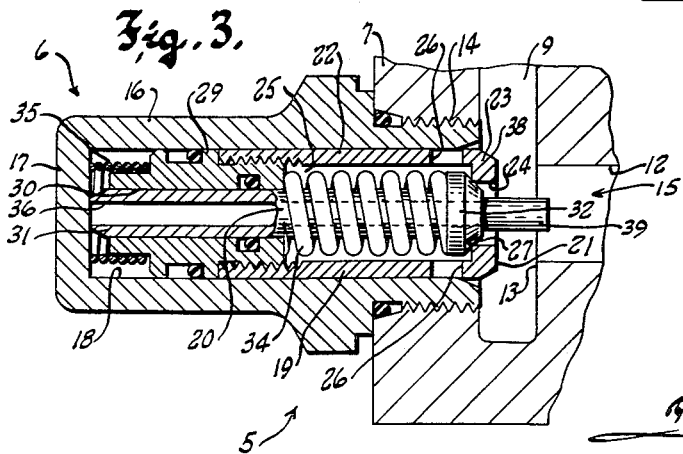
FIGURE 3 is a view similar to FIGURE 1, but illustrating the manner in which the poppet mechanism is unseated in response to an abnormally low pressure condition in the system.

Referring now to the accompanying drawings, FIGURES 1 to 3, inclusive, illustrate how a more or less conventional hydraulic control valve 5 can be equipped with one form of relief valve 6 of this invention. The relief valve 6 is mounted on a portion of the housing 7 of the control valve that has adjacent and substantially parallel high pressure and low pressure passages 8 and 9 respectively. The passage 8 is actually one of the service passages of the control valve, and it terminates in a motor port 10 that is connectible with one end of a hydraulic cylinder, not shown. Actuation of a suitable control spool (not shown) causes high pressure fluid to be diverted to the service passage 8 and hence to one end of a cylinder that may be connected to motor port 10. Consequently, the service passage 8 may be considered a high pressure supply line of a fluid pressure operated system. The low pressure passage 9 is actually a branch of the exhaust passage means in the housing 7 of the control valve and, hence, it may be considered a return or reservoir line of a fluid pressure operated system. The return line 9, of course, is connectible with a reservoir that may hold a supply of hydraulic fluid either at atmospheric pressure or at a pressure slightly above atmospheric.

For the purpose of this invention, the housing 7 of the control valve 5 is bored to provide a passage 12 that acts as a by-pass connecting the high pressure supply line 8 with the low pressure return line 9, and which by-pass opens to the low pressure passage 9 through an outwardly or rearwardly facing annular valve seat 13 that is coaxial with the passage 12. Though not essential, the valve seat 13 has been shown as a flat annular surface normal to the axis of the passage 12.

The housing of the control valve also has formed therein a large internally threaded hole 14 coaxial with the passage 12, and leading from the return passage 9 outwardly to the exterior of the housing. The relief valve 6 comprises poppet mechanism 15 mounted in a cylindrical case 16 having its open forward end screw threaded into the hole 14 to mount the relief valve on the housing of the control valve 5. The case 16 provides a cylinder closed at its rear by an end wall 17, and having a bore 18 coaxial with the valve seat 13, in which the poppet mechanism 15 is axially slidably received. The forward end portion of the poppet mechanism projects out of the open front of the case or cylinder 16 and into the return passage 9 for cooperation with the valve seat 13.

The poppet mechanism 15 comprises a hollow, substantially tubular outer low pressure poppet 19, and a tubular inner high pressure poppet 20, mounted coaxially inside the outer poppet. The front 21 of the outer poppet provides a valve member that is normally abuttingly engaged with the valve seat 13, and as seen in FIGURE 1, the two poppets 19 and 20 cooperate to normally close the passage 12 and thus block communication between the high and low pressure passages 8 and 9, respectively. However, the poppet mechanism 15 is adapted to be moved rearwardly off of the seat 13 to communicate the passages 8 and 9 whenever the pressure of fluid in passage 8 drops to a value below that of fluid in the return passage 9, so as to allow fluid from the return passage to flow to the high pressure side of a hydraulic system via the service passage 8 of the control valve. From the description thus far, it will be appreciated that the housing of the control valve 5 cooperates with the case 16 of the relief valve to provide a body in which the poppet mechanism is mounted. The body, of course, contains the high and low pressure passages 8 and 9, respectively, and the passage 12 which provides a low pressure relief passage in the body that opens to the return passage 9 through the annular valve seat 13. Since this low pressure relief passage 12, which is normally closed by the poppet mechanism 15, is adapted to be at all times communicated with the high pressure side of a fluid pressure operated system via the service passage 8 and motor port 10, it can also be referred to as a system port that reflects the pressures obtaining in the high pressure side of the system.

The forward portion of the outer poppet 19 comprises a cylindrical side wall 22 of a diameter to slidingly fit the bore 18, and it terminates in an annular inwardly directed flange 23 at its front. This flange defines a hole 24 that is coaxial with the bore 18 and passage 12, and leads rearwardly into a chamber 25 in the interior of the outer poppet. The chamber 25 forms part of a high pressure relief passage in the outer poppet, one end of which relief passage opens to the system port or passage 12 through the hole 24, and the other end of which opens to the return or reservoir passage 9 through one or more radial apertures 26 in the side wall 22 of the outer poppet.

The hole 24 opens to the chamber 25 through an annular valve seat 27 that is normally engaged by the inner or high pressure poppet 20. Hence, the high pressure relief passage is normally blocked by the inner poppet, and the latter is caused to be moved rearwardly away from its seat 27 whenever the pressure of fluid in the system, manifested in the system port 12, rises to a predetermined and undesired high value, to allow fluid to flow from the high pressure side of the system (service passage 8) and to the reservoir or return line 9 via passage 12 and the high pressure relief passage provided by the hole 24, chamber 25 and apertures 26.

It should be observed that the hole 24 in the front of the outer poppet is smaller in diameter than the system port provided by the passage 12, and that the system port, in turn, is smaller in diameter than the bore 18 in which the poppet mechanism operates.

The outer poppet 19 further comprises a piston 29, secured in the rear of the sleeve 22, and slidingly confined in the rear portion of the cylinder provided by the case 16. The piston has a coaxial bore 30 therethrough, smaller in diameter than the hole 24 in the front of the outer poppet, in which the tubular stem 31 of the inner poppet is slidingly received, so that the inner poppet is guided for reciprocatory motion toward and from a normal forward position at which an enlarged head 32 on the front of the inner poppet is sealingly engaged with the seat 27 on the inner side of the flange 23 of the outer poppet.

It will be seen, therefore, that with the normal positions of the inner and outer poppets shown in FIGURE 1, the outer poppet has sealing engagement with the seat 13 on the housing of the control valve, while the enlarged head 32 of the inner poppet has sealing engagement with the valve seat 27 around the inner end of the hole 24.

Hence, the inner poppet closes the high pressure relief passage in the outer poppet, and also cooperates with the outer poppet to close the low pressure relief passage provided by the return line 9 and the system port 12.

Fluid at normally high system pressure manifested in the system port 12 acts both upon the front of the outer poppet and upon the head 32 of the inner poppet, tending to move both rearwardly from their normal positions seen in FIGURE 1. A substantially strong compression spring 34 surrounding the stem 31 of the inner poppet, confined between its head 32 and the front of the piston 29, normally prevents the inner poppet from being moved rearwardly off of its seat, but yields to allow such opening of the inner poppet when the pressure in port 12 rises to a predetermined high value. When that occurs, the inner poppet is unseated to allow high pressure fluid to flow through the relief passage in the front portion of the outer poppet to the return line 9.

Another compression spring 35 confined in a pressure chamber behind the piston 29, exerts a light bias upon the outer poppet 19 through the piston 29 in the direction to hold its forward end in sealing engagement with the seat 13. However, it is a feature of the valve of this invention that the bore 36 of the inner poppet extends coaxially through the head 32 of the poppet, as well as the stem 31. Hence, the pressure chamber in the closed end of the cylinder or case 16, behind the piston 29, will normally contain fluid at the same high pressure as obtains in the high pressure side of the system, and such fluid will exert a biasing force on the outer poppet sufficient to hold the same in its forwardly seated or normal operating position seen in FIGURE 1. Due to the larger diameter of the piston 29, of course, this biasing force will always be greater than the force which pressure fluid in the system port 12 can exert upon that portion of the front of the outer poppet that extends inwardly of the valve seat 13.

From the description thus far, it will be apparent that in the event the pressure of fluid in the cylinder supply line 8 and system port 12 rises to an abnormally high value, the inner poppet 24 will be unseated in the manner described, to relieve the high pressure condition, after which the inner poppet will be returned to its seat 27 by its spring 34 to again block the high pressure relief passage through the front of the outer poppet.

In the event the pressure in the cylinder supply line 8 and the system port 12 drops, the reduced pressure condition is immediately mirrored in the pressure chamber behind the piston 29, and there will be less bias tending to hold the outer poppet seated. Whenever the pressure in the high pressure side of the system fed by the cylinder supply line 8 drops to a value below that of fluid in the return line 9, and at which there is danger of drawing a void in the end of a cylinder connected with the supply line 8, the outer poppet 19 is caused to be moved rearwardly off of its seat 13 to allow reservoir fluid to flow into the supply line to prevent voids forming in the cylinder. To assure such opening of the poppet mechanism, the front of the outer poppet is formed with a forwardly facing annular shoulder 38 on its exterior, radially outwardly of the seat 13, against which fluid at low pressure in the return passage 9 may act with a force greater than that imposed upon the piston by fluid in the rear of the cylinder at the abnormally low pressure obtaining at the system port 12. Both the outer poppet and the inner poppet move rearwardly in unison to the relief position seen in FIGURE 3, to allow fluid to flow from the reservoir passage to the cylinder supply passage 8.

A tubular and slightly reduced forward extension 39 on the head 32 of the inner poppet extends through the hole 24 in the front of the outer poppet and acts to improve flow characteristics whenever pressure fluid is being transferred between the high and low pressure passages 8 and 9, respectively.

The combined high pressure relief and void control valve of FIGURES 1 to 3, requires that the valve seat for the low pressure relief poppet be formed in the body of the control valve to which the relief valve is attached. FIGURE 4, however, illustrates a version of the relief valve mechanism of this invention which features a unitary structure having its own low pressure poppet seat 40.

While the poppet mechanism 15 in this instance is the same as that previously described, its casing 41 completely encloses it. It is assembled into the bore 18 of the casing from the rear thereof, and retained in position within the cylinder provided by the casing by a plug 42 having a screw threaded connection 43 with the rear of the casing. The plug thus serves as the outer end wall against which the biasing spring 35 of the outer poppet abuts.

The forward end portion of the casing is extended beyond the front of the poppet mechanism and terminates in a reduced tubular neck 44. The bore 45 of the neck provides a system port of the same diameter as the port 12 previously described, which opens rearwardly into the larger diameter bore 18 of the casing through the annular low pressure relief valve seat 40. Since in this instance the casing 41 is extended beyond the front of the poppet mechanism 15, it is provided with large diameter radial holes 46 in its side wall, which holes provide reservoir ports that register with the low pressure return passage 9 of a control valve 5 when the relief valve mechanism is attached thereto in the manner seen in FIGURE 4. As therein shown, the casing 41 is threaded into a hole 47 in the housing of the control valve outwardly of the passage 9, and its reduced neck 44 is snugly received in a bore 48 that is coaxial with the hole 47 and extends between the high and low pressure passages 8 and 9, respectively. O-ring seals 49 and 50 are preferably employed as shown to prevent leakage.

The radial holes 46, of course, also register with the ports 26 in the side wall of the outer poppet 19, so as to allow high pressure fluid to flow to the return passage 9 when the inner poppet 20 is unseated. The ports 46 also allow pressure fluid in the return line 9 to act upon the annular forwardly facing shoulder 38 of the outer poppet 19, and open the same when the pressure of fluid in the supply line or system port 45 drops to a value below that of fluid in the return line 9.

In the valve of FIGURE 4, one end of the low pressure relief passage is comprised of the system port provided by the bore 45 on the extension at the front of the casing 16, and the radial holes 46 comprise the other end of the low pressure relief passage. The holes or bores 45 and 46 also comprise the ends of the high pressure relief passage, the intermediate portion of which extends through the hollow front of the outer poppet 19.

Those skilled in the art will appreciate that the combined high pressure relief and void control valve mechanism of FIGURE 4 may be connected anywhere in a fluid pressure operated system, as for example, by the expedient shown in FIGURE 5. As therein seen, the reduced tubular extension 44 of the casing has a high pressure system line 45' connected thereto so that fluid at normal high pressures will be present in the system port 45. The casing would have only one radial hole 46 in its side, and a return duct 9' would be connected in the mouth of said hole 46.

Other ways of utilizing the combined high pressure relief and void control valve of this invention will occur to those skilled in the art. For example, a valve mechanism such as illustrated in either FIGURES 4 or 5 may have an externally threaded tubular portion 44 secured in the wall of a reservoir (not shown) with the remainder of the body inside the reservoir, and with the tube 45' secured to the externally projecting end of the neck in the manner illustrated in FIGURE 5. In this case, of course, there would be no need for a return line 9', for the relief valve would be submerged in the liquid contained in the reservoir, and its radial holes 46 would open directly to the interior of the reservoir.

The combined high pressure relief and void control valve seen in FIGURE 6 is generally like that disclosed in FIGURE 4. It differs only in that the tubular stem 31', which extends coaxially through the hollow outer poppet, is fixed with respect to the piston 29 rather than to the inner poppet. The inner or high pressure poppet 52 in this case comprises an annulus that is slidably mounted on the stem 31' to be guided thereby for fore and aft movement inside the outer poppet toward and from engagement with the annular rearwardly facing valve seat 40 on the outer poppet.

The stem 31' projects forwardly through the high pressure poppet 52, and into the system port 45, similarly to the extension 39 on the head 32 of the poppet of FIGURE 4, and an O-ring seal 53 is confined in an inwardly opening groove in the bore of the annular poppet 52 to prevent leakage of fluid past the poppet when it is engaged with its seat 40.

From the foregoing description, together with the accompanying drawings, it will be readily apparent to those skilled in the art that this invention provides a compact, low cost, and dependable relief valve mechanism, which is designed to serve the dual function of relieving abnormally high pressures in a fluid pressure operated system in which it is connected, and also of relieving abnormally low pressures that would otherwise produce voids in the system.

What is claimed as our invention is:

A valve mechanism for relieving both abnormally high and abnormally low pressures in a fluid pressure operated system having high pressure fluid supply and low pressure fluid return lines which are communicable with one another through an annular valve seat, comprising:

(A) a body providing a cylinder which is open at its front and closed at its rear;
(B) means providing a piston which is slidable axially in the cylinder;
(C) and poppet mechanism carried by the piston and guided thereby for axial movement therewith toward and from a normally closed forward operating position at which the poppet mechanism is adapted to block communication between the supply and return lines of a fluid pressure operated system, said poppet mechanism comprising
  (1) a hollow low pressure outer poppet which is fixed with respect to the piston and projects from the front thereof, said outer poppet having
    (a) a system port opening through its front for communication with the high pressure fluid supply line of a fluid pressure operated system,
    (b) an annular portion surrounding said system port for engagement with the seat through which the supply and return lines of a fluid pressure operated system are communicable,
    (c) an annular rearwardly facing valve seat on its front portion through which the system port opens to the hollow interior of the poppet,
    (d) a reservoir port opening through the side of the poppet, to communicate the system port with the return line of a fluid pressure operated system whenever said valve seat on the outer poppet is open,
    (e) means yieldingly urging the poppet forwardly toward said closed position of the poppet mechanism,
    (f) and a forwardly facing shoulder on the poppet surrounding a front portion thereof and providing an annular surface upon which fluid in the return line of a fluid pressure operated system can impose force to effect unseating of the outer poppet whenever the pressure of fluid at the system port drops to a predetermined low relief value below the pressure of fluid at the reservoir port, (2) an inner high pressure poppet within the outer poppet, supported from the piston for motion relative thereto toward and from a forward operating position to control communication between the system and reservoir ports, said inner poppet having a seat engaging portion at its front to engage said seat on the outer poppet in the forward operating position of the inner poppet, and which seat engaging portion presents a forwardly facing surface upon which fluid at the system port can exert force to effect unseating of the inner poppet when the pressure of such fluid reaches an abnormally high value, (3) yieldable biasing means acting upon the inner poppet to maintain it in its forward operating position as long as the pressure of fluid at the system port remains below a predetermined high relief value, (4) and means defining a duct that extends axially through the piston and the inner poppet, said duct having one end in communication with the system port, and its other end opening into the closed rear portion of the cylinder so that fluid at normally high system port pressure will be maintained in the cylinder to exert forward bias on the outer poppet through the piston to which it is fixed, the same duct also providing an exhaust passage by which fluid in the closed rear portion of the cylinder can be exhausted through the system port to permit the piston to move rearwardly in the cylinder at times when the outer poppet opens.

References Cited in the file of this patent
UNITED STATES PATENTS

| | | |
|---|---|---|
| 1,651,971 | Shield | Dec. 6, 1927 |
| 2,665,708 | Ghormley | Jan. 12, 1954 |
| 2,979,077 | Swenson | Apr. 11, 1961 |